United States Patent
Bougalt

(10) Patent No.: US 7,631,113 B2
(45) Date of Patent: Dec. 8, 2009

(54) CONTROL SYSTEM FOR A SYSTEM RENDERED SECURE THROUGH DIVERSIFICATION

(75) Inventor: Cyrille Bougalt, Guyancourt (FR)

(73) Assignee: Alstom Transport SA, Levallois-Perret (FR)

( * ) Notice: Subject to any disclaimer, the term of this patent is extended or adjusted under 35 U.S.C. 154(b) by 448 days.

(21) Appl. No.: 11/716,956

(22) Filed: Mar. 12, 2007

(65) Prior Publication Data

US 2007/0260773 A1 Nov. 8, 2007

(30) Foreign Application Priority Data

Mar. 17, 2006 (FR) .................................. 06 02390

(51) Int. Cl.
*G06F 3/00* (2006.01)
(52) U.S. Cl. ............................................ 710/20; 710/5
(58) Field of Classification Search ...................... 710/5, 710/20
See application file for complete search history.

(56) References Cited

U.S. PATENT DOCUMENTS

| | | | |
|---|---|---|---|
| 6,308,117 B1 | 10/2001 | Ryland et al. | |
| 2003/0098197 A1* | 5/2003 | Laurent et al. | 180/401 |
| 2005/0107890 A1 | 5/2005 | Minkowitz et al. | |

FOREIGN PATENT DOCUMENTS

| | | |
|---|---|---|
| DE | 20 2005 016 151 U1 | 2/2006 |
| DE | 20 2005016 151 U1 | 2/2006 |
| EP | 1 038 752 A1 | 9/2000 |
| EP | 1 085 415 A2 | 3/2001 |
| EP | 1 197 418 A1 | 4/2002 |
| WO | WO 03/070537 | 8/2003 |

OTHER PUBLICATIONS

Preliminary Search Report of priority application FR 06 02390, English translation.

* cited by examiner

*Primary Examiner*—Alford W Kindred
*Assistant Examiner*—David E Martinez
(74) *Attorney, Agent, or Firm*—Davidson, Davidson & Kappel, LLC

(57) ABSTRACT

This control system for a system rendered secure by diversification comprises: a set of processors processing railway commands, arranged in parallel and each capable of receiving different sets of instructions, a component for selecting commands selected from the output data issuing from the processors.

The modular applications automatic systems are identical for all sets of instructions and each set of instructions associated with a processor is specific for creating a separate sequencer for the successive activation of modular application automatic systems in a particular sequence.

15 Claims, 6 Drawing Sheets

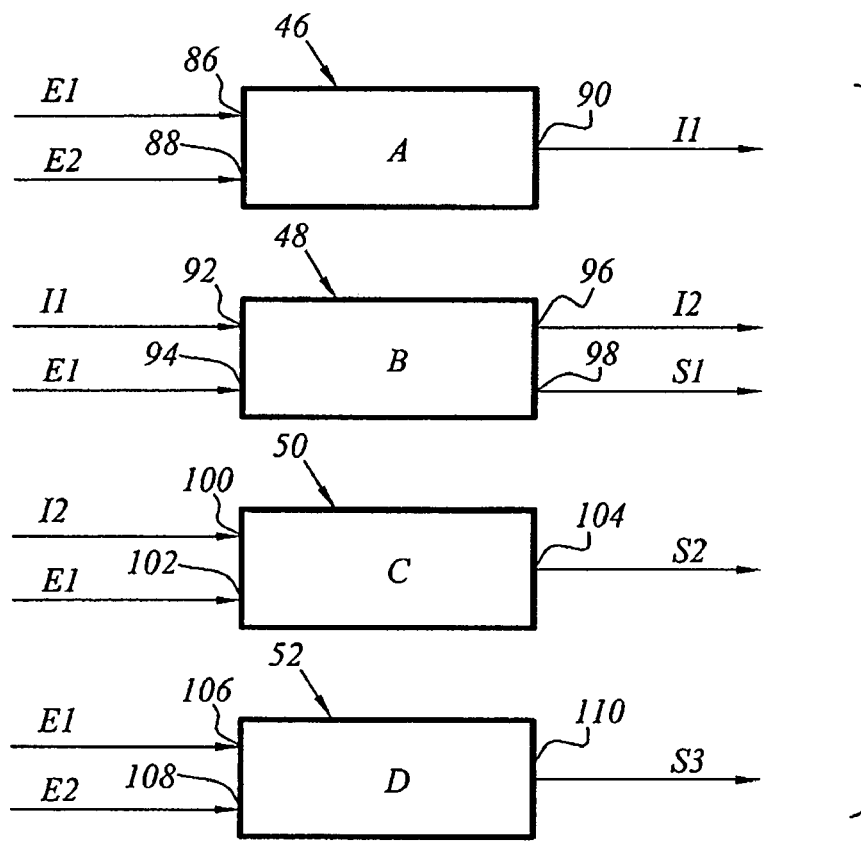
*FIG.4A*
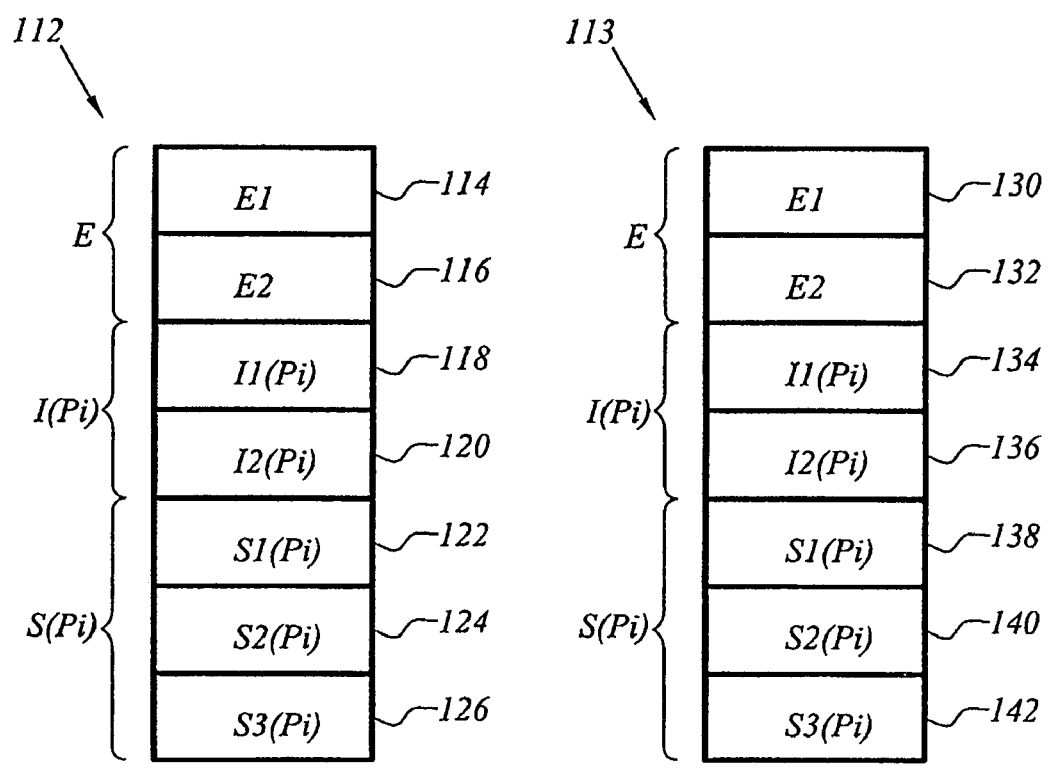
*FIG.4B*  *FIG.4C*

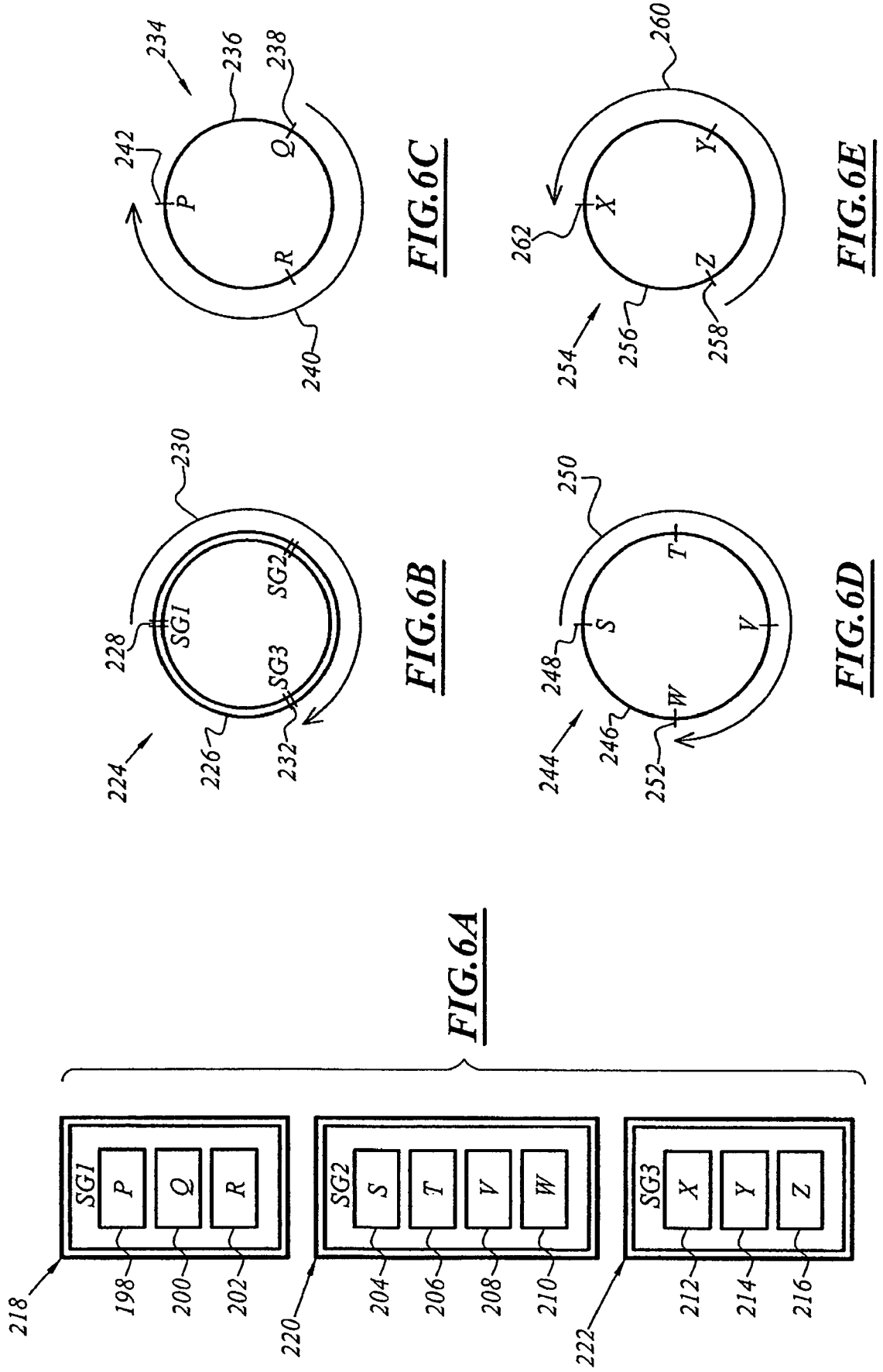

CONTROL SYSTEM FOR A SYSTEM RENDERED SECURE THROUGH DIVERSIFICATION

TECHNICAL FIELD

This application claims the benefit of French Patent Application 06 02390 filed Mar. 17, 2006 the entire disclosure of which is hereby incorporated by reference herein.

The invention relates to a control system for a system in particular a railway system which has been rendered secure through diversification, of the type including:

a set of at least two processors processing commands intended for the railway system, arranged in parallel to receive identical input data E on a corresponding input, each processor being capable of receiving two different sets of instructions through which it can compute and deliver identical output data S(P1), S(P2), S(P3) at different outputs in relation to the identical input data E, a command selection component provided with at least two inputs, each input being connected to a processor output, and a command output capable, on the basis of a predetermined criterion, of delivering a command signal selected from the output data issuing from the processors.

The railway system includes a switching system connected to a level crossing system and a system giving warning of closure of the crossing barrier.

BACKGROUND TO THE INVENTION

For safety reasons it is known that a control system for a railway system can be diversified in the form of processing branches having different computation circuit configurations. On the basis of the same input data each processing branch carries out the same applications or application algorithms, but using different forms of computation.

In the situation where each branch is functioning correctly, identical commands are issued as outputs from each branch.

If there should be a failure in the circuitry of one of the branches different commands are produced.

In the case where several branches fail simultaneously, different commands are also produced because of the lack of breakdown correlation between branches having different computation circuit configurations. This conventional arrangement is particularly advantageous when complex algorithms are used.

One well-known simple implementation of this secure control system, from the physical point of view, comprises providing a processor of identical architecture in each branch.

In this well-known implementation each processor runs a different set of instructions or object program originating from a different source program depending upon the language of the different associated compiler, each different source program emulating the same application defined by the same inputs, the same outputs and the same application algorithms.

However, this implementation, which is simple from the physical point of view, remains complex from the software point of view, requiring the development of many software components in proportion to the number of different languages or compilers used.

The specific problem arising with such a conventional control system rendered secure through diversification is the complexity of the development of the software components using several compilation languages.

SUMMARY OF THE INVENTION

An object of the invention is therefore to provide a control system which has been rendered secure through diversification in respect of which development of the software components requires reduced effort.

For this purpose the present invention provides a control system for a railway system which has been rendered secure through diversification including:

a set of at least two processors processing commands intended for the railway system, arranged in parallel to receive identical input data E on a corresponding input, each processor being capable of receiving two different sets of instructions through which it can calculate and deliver identical output data S(P1), S(P2), S(P3) at different outputs in relation to the identical input data E, a command selection component provided with at least two inputs, each input being connected to the output of a processor, and a command output capable, on the basis of a predetermined criterion, of delivering a command signal selected from the output data originating from the processors, wherein:

each set of instructions associated with a processor makes it possible to run at least two modular application automatic systems, the modular application automatic systems being identical for all the sets of instructions, each set of instructions associated with a processor is specific to creating a subsequent activation sequencer for the modular application automatic systems in an associated sequence, and in which each sequencer differs from the other sequencers through its specific associated sequence.

According to particular embodiments the control system rendered secure through diversification may include one or more of the following features:

each sequencer specifically activates and sequences the modular application automatic systems on the basis of a different cyclical sequence of running the application automatic systems having the same cycle and a different cycle start or path direction, each sequencer specifically activates and sequences the modular application automatic systems on the basis of a different cyclical sequence of running the application automatic systems having the same cycle path in the same direction, each sequencer specifically activates and sequences the modular application automatic systems on the basis of a different sequencer sequence formed from a succession of partial sequences of modular application automatic systems grouped into subgroups subdividing the set of modular application automatic systems in the control system, the subgroups of automatic systems are the same for all the processors, each modular application automatic system includes automatic system inputs and automatic system outputs, an automatic system input being external when it is capable of receiving a variable item of input data from the control system, an automatic system output being external when it is capable of delivering a variable item of output data from the control system, an input and an output from a given automatic system or two different automatic systems being internal when they are capable of being interconnected and exchanging a given internal variable item of data, the set of variable input and output data of the automatic systems form a state vector for the control system, and the control system for each processor includes a working memory including:

a register for the start state when running the sequence of automatic systems including the values for the set of state variables before the sequence of automatic systems is run, a register for the end state when running the sequence of automatic systems including the values of the set of the state variables of the state vector obtained after running the sequence of automatic systems, for each processor, and while the sequence is being run, the processor may only read from the start state register and only write to the end state register, for each processor, the start state register for the sequence may only be written to and refreshed by the values for the state variables present in the sequence end register once the sequence has been run, and each processor is able to run the sequence of automatic systems repeatedly until the values for the state variables of at least two associated state registers are the same, each processor includes a program database including a set of processor instructions which can be loaded into the processor and are capable of running the sequence of application automatic systems in the sequence ordered by the sequencer associated with the processor, each program database includes a set of instructions obtained using the same compiler, a command selection component is a component reaching a decision on the basis of a majority vote from the output data originating from all the processors, the component being able to compare the output data originating from the respective outputs from each processor and transmit common output data on a majority basis in relation to the set of processors on the basis of the predetermined majority criterion, and the command selection component is a component making decisions on the basis of unanimity.

The invention also provides a control process rendered secure through diversification including stages of:

loading at least two processors with program databases associated with different sets of instructions, providing identical input data for processors arranged in parallel via respective inputs, causing each processor to run the set of different instructions associated with it so that it can compute and deliver identical output data at respective outputs on the basis of identical input data E, the running of a set of instructions by a processor including the stages of:

running at least two modular application automatic systems, the modular applications automatic systems being identical for each set of instructions, in a specific sequence which is different from the sequences for the other sets of instructions, extracting the output data obtained after running the sequence, delivering output data to the command selection component, and selecting a command signal selected from the output data originating from the processors, on the basis of a specific criterion.

According to particular embodiments, the secure control process may include one or more of the following features:

validating or correspondingly prohibiting transmission of the command issuing from the plurality of output data received, on the basis of the selection criterion, and in the event of prohibition, signalling the existence of a fault in at least one processor.

BRIEF DESCRIPTION OF THE FIGURES.

The invention will be better understood from a reading of the following description provided purely by way of example and with reference to the appended drawings, in which:

FIG. 4A is a diagrammatical view of the respective inputs and outputs associated with each of the automatic systems illustrated in FIGS. 2A, 2B, 2C, FIGS. 4B and 4C are respectively diagrammatical views of the structure of the state vector data associated with a sequence start state register and a sequence end state register in any working memory, FIGS. 6A, 6B, 6C, 6D, 6E are a sequence of a second embodiment of the program databases.

DESCRIPTION OF PREFERRED EMBODIMENTS

Figure 1:
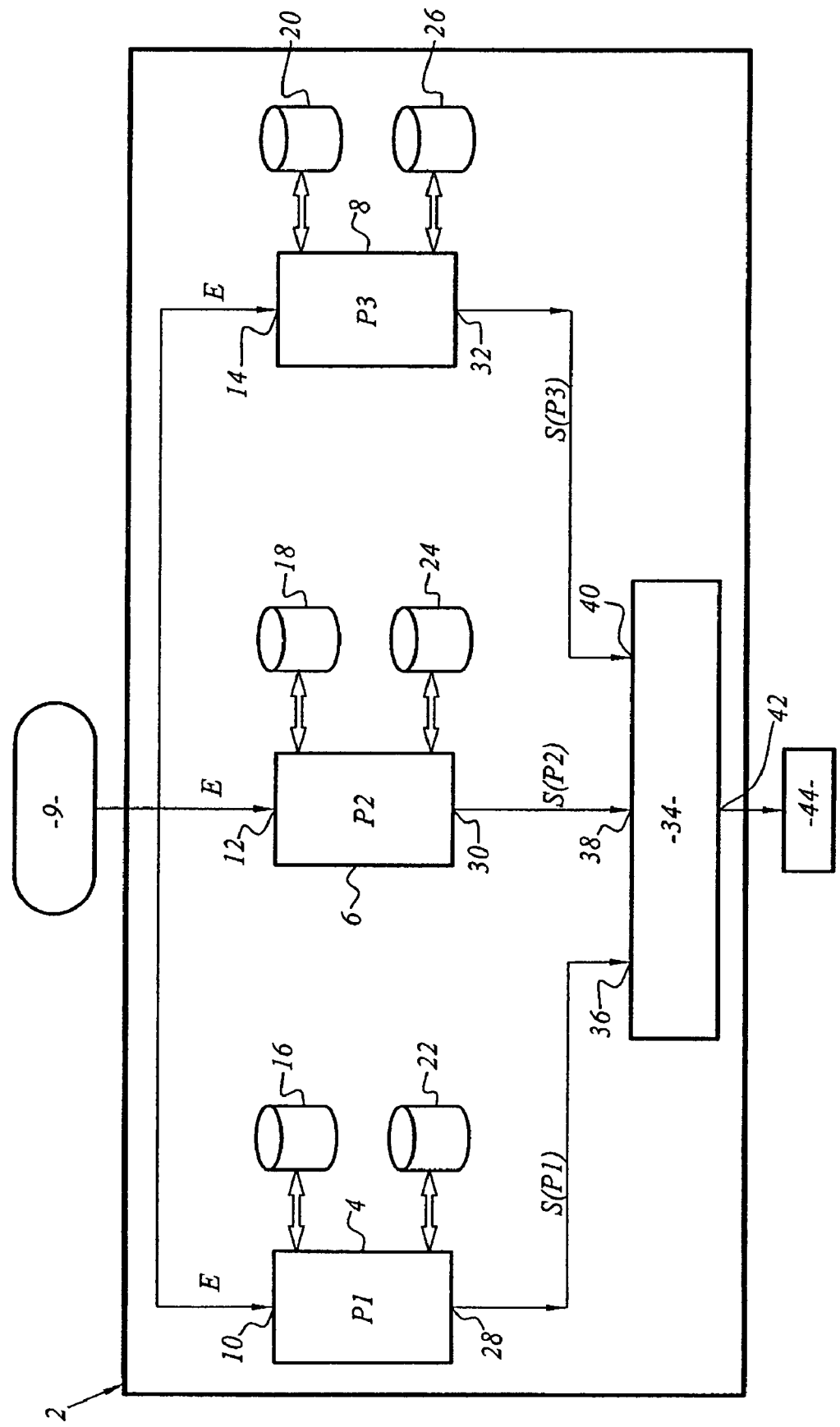
FIG. 1 is a diagrammatical block diagram of a control system rendered secure through diversification.

Control system 2 rendered secure through diversification illustrated in FIG. 1 includes three computational or processing systems, each respectively comprising a first processor 4 or P1, a second processor 6 or P2 and a third processor 8 or P3.

Each processor 4, 6, 8 receives the same input data originating from a predetermined railway system 9 through an associated input 10, 12, 14.

Each processor 4, 6, 8 specifically runs a computational program or set of instructions loaded from an associated program database 16, 18, 20 to which it is connected, respectively.

Each processor 4, 6, 8 can exchange working data with an associated working database 22, 24, 26.

Each processor 4, 6, 8 is provided with an associated output 28, 30, 32 capable of delivering output data S(P1), S(P2), S(P3) after processing.

Secure control system 2 also includes a command selection component 34 in this case comprising three inputs 36, 38, 40. Each input 36, 38, 40 can receive the output signal (S(P1), S(P2), S(P3) originating from each processor 4, 6, 8 or (P1, P2, P3).

Command selection component 34 includes an output 42 connected to a command receiving terminal 44.

Figure 2C:
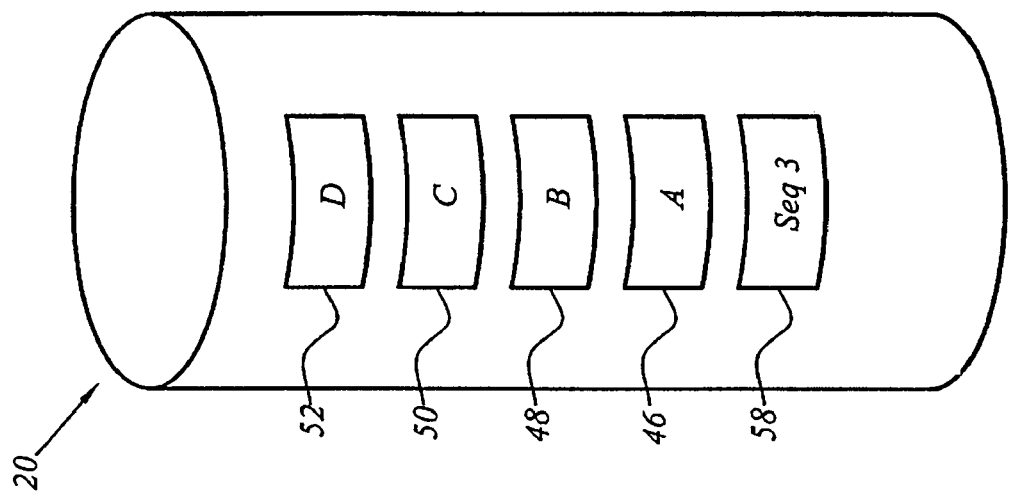
FIGS. 2A, 2B, 2C are respectively a block diagram of a first embodiment of the program database illustrated in FIG. 1, FIGS. 3A, 3B, 3C are respectively an illustration of the sequences associated with each of the program databases in FIGS. 2A, 2B, 2C.
Figure 2B:
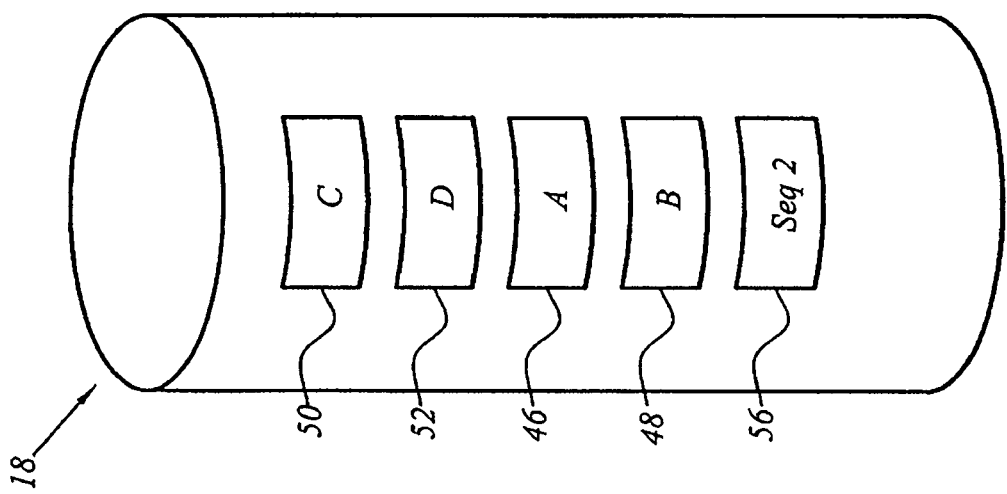
Figure 2A:
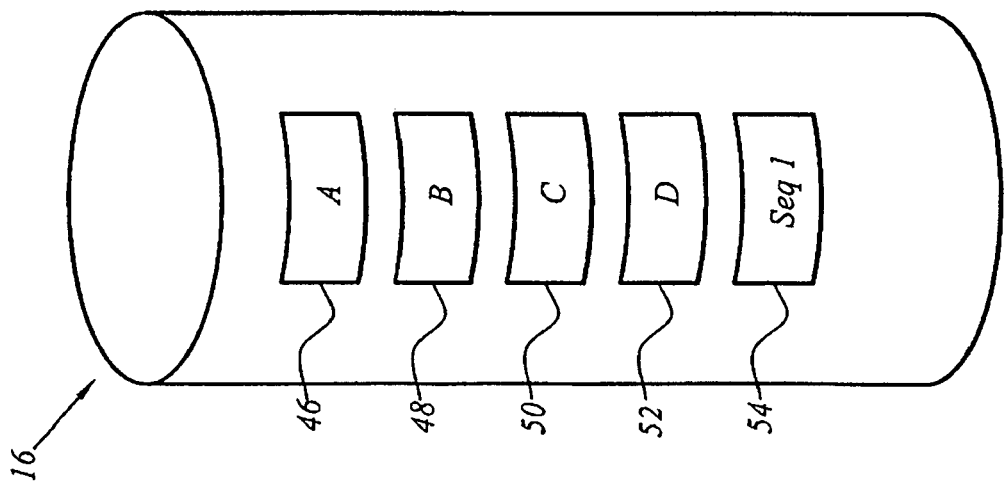

The structural content of the first embodiment of each program database 16, 18, 20 associated with each processor 4, 6, 8 is illustrated in FIGS. 2A, 2B, 2C respectively.

First program database 16 associated with first processor P1 includes a sequence of automatic systems 46, 48, 50, 52 or A, B, C, D ordered in the order A, B, C, D in a first sequence and a first sequencer 54 or Seq1 controlling the sequencing of the automatic systems in that order.

Second program database 18 associated with second processor P2 includes the same automatic systems ordered in second different sequence 50, 52, 46, 48 or C, D, A, B and a second sequencer 56 or Seq2 controlling the sequencing of the automatic systems in that order.

Third program database 20 associated with third processor P3 includes automatic systems A, B, C, D ordered in yet a third different sequence D, C, B, A and a third sequencer 58 or Seq3 controlling the sequencing of the automatic systems in that order.

The automatic systems corresponding to a given application in each program database are identical insofar as they are generated from a given source code and the same compiler.

All the automatic systems in each database are generated using the same compiler.

Figure 3A:
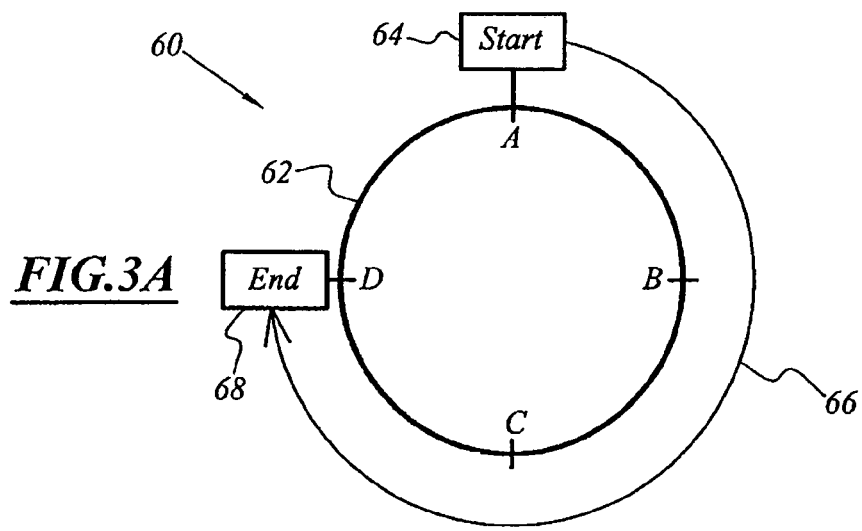
Figure 3B:
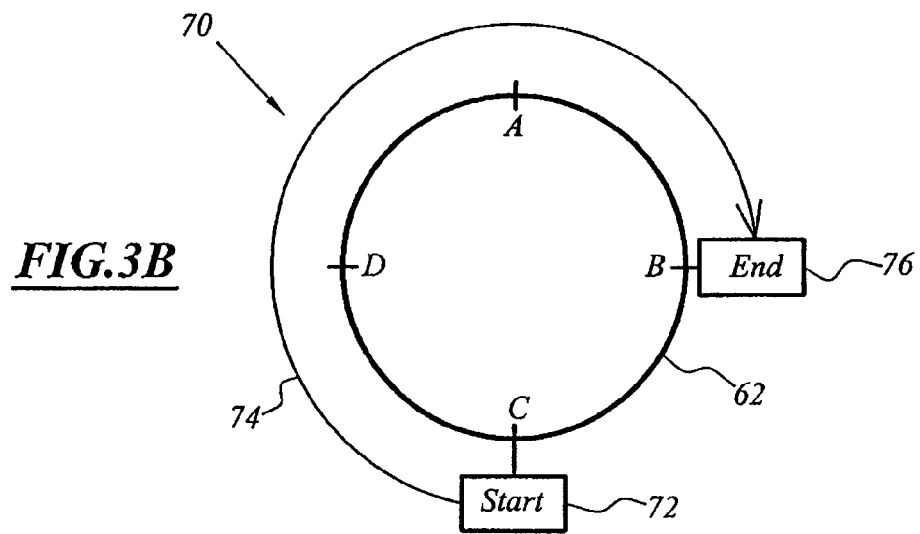
Figure 3C:
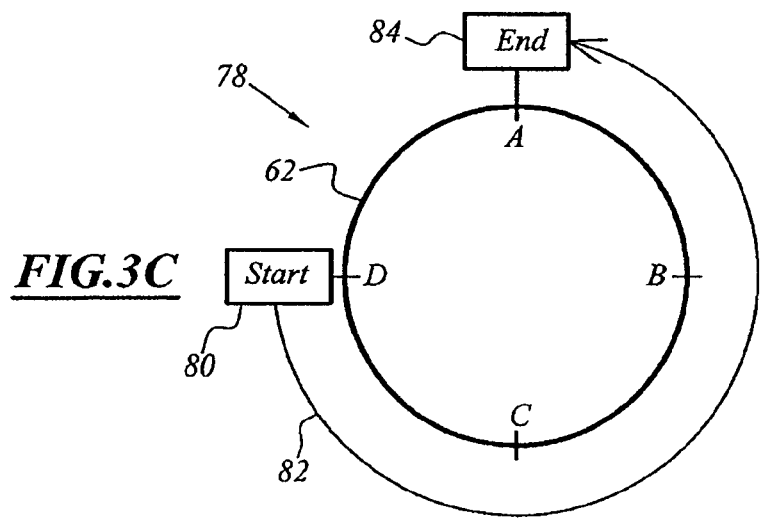

The first, second and third sequences implemented by sequencers Seq1, Seq2 and Seq3 are described in FIGS. 3A, 3B, 3C. Each sequence 60, 70, 78 formed from a given cycle 62 includes a sequence start 64, 72, 80, here A in FIG. 3A, C in FIG. 3B, and D in FIG. 3C. This sequence 60, 70, 78 is run in a direction 66, 74, 82, a clockwise direction 66 in FIG. 3A, a clockwise direction 74 in FIG. 3D and an counter-clockwise direction 82 in FIG. 3C, respectively. A sequence end 68, 76, 84 resulting from the path of each sequence 60, 70, 78 from the start 64, 72, 80 corresponds to each sequence 60, 70, 78.

FIG. 4A shows the set of automatic systems intended for modular applications. Here automatic system A simulates a route model, automatic system B is used to simulate a level crossing model, automatic system C simulates an announcement model and automatic system D reproduces a switching model.

Automatic system A receives two input signals E1, E2 from the railway system on two inputs 86, 88 and provides a first internal signal I1 at output 90.

Automatic system B has two inputs 92, 94 receiving first internal signal I1 and first input signal E1 from the railway system respectively. Automatic system B is also provided with two outputs 96, 98 which can produce a second internal signal I2 and a first external output signal S1.

Automatic system C receives second internal signal I2 and first external input signal E1 on two inputs 100, 102 respectively. Automatic system C delivers a second external output signal S2 at an output 104.

Automatic system D receives first external input signal E1 and second external input signal E2 on two inputs 106, 108. Automatic system D delivers a third external output signal S3 at a single output 110.

Here first external input signal E1 is a current time while second external input signal E2 is an indicator that a railway location mark has been passed. First internal variable I1 here represents an expected crossing time at a level crossing and second internal variable I2 represents the computed announcement command time.

First external output signal S1 is a command to lower the barriers at the level crossing, second external output signal S2 is the command announcing closure of the level crossing while third external output signal S3 is a switching command.

Each working memory 22, 24, 26 associated with a processor (P1, P2, P3) includes a sequence start state register 112 and a sequence end state register 113 which are common to the processors (P1, P2, P3) and illustrated in FIGS. 4B and 4C respectively.

Each of the registers illustrated in FIGS. 4B and 4C is represented by a corresponding state vector. The state vector of sequence start register 112 in FIG. 4B includes seven memory locations 114, 116, 118, 120, 122, 124, 126, and is subdivided into three memory zones, a first zone 114, 116 which can place the two external inputs E1, E2 in memory, a second zone I(Pi), 118, 120 which can place the two internal variables I1(Pi), I2(Pi) in memory and a third zone S(Pi), 122, 124, 126 which can place external output data S1(Pi), S2(Pi) and S3(Pi) in memory.

Sequence end state register 113 includes a structure 130, 132, 134, 136, 138, 140, 142 similar to the memory locations 114, 116, 118, 120, 122, 124, 126 of sequence start state register 112.

Figure 5:
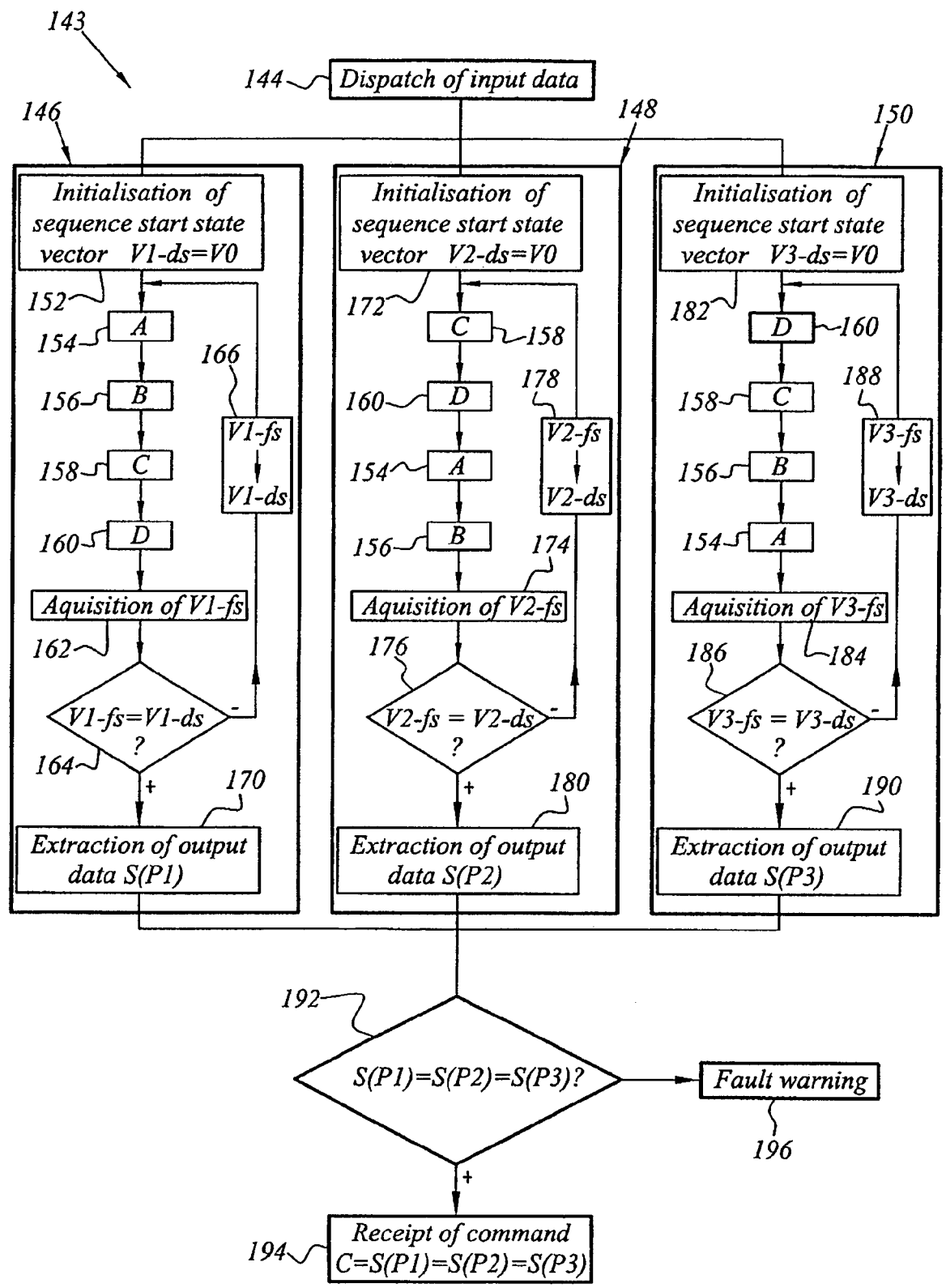
FIG. 5 is a flow chart of the control process implemented through the diversification control device in accordance with the first embodiment of the program databases.

Operation of the control system rendered secure through diversification is described by the flow chart in FIG. 5, which is implemented by processors P1, P2 and P3.

In a first stage 144 the railway system sends the same input data E to each of processors P1, P2 and P3 in a common way so that they can carry out the corresponding processing 146, 148 and 150. In a first stage 152 first processor P1 initialises sequence start state register 112 shown by state vector V1-ds in FIG. 5. Then it runs first automatic system 154, here A, then second 156, here B, then third 158, here C, then fourth 160, here D, according to the first sequence associated with first processor P1 and illustrated in FIG. 3A.

At the end of the sequence the output data obtained from each automatic system A, B, C, D form state vector V1-fs at 162 associated with sequence end state register 113.

In test stage 164 which follows, the state vector of sequence start state register V1-ds is compared with sequence end state register V1-fs.

If state vectors V1-ds and V1-fs are not the same, first sequence A, B, C, D is run again, after sequence start record 112 has been previously refreshed with state vector V1-fs in sequence end state register 113. If the state registers have the same state vector V1-ds and V1-fs in test stage 164 the output data are then extracted to stage 170.

Processing 148 by second processor P2 is similar to that for first processor P1 except for the order of the automatic systems. Thus at the start of processing a task 172 of initialising the sequence start state register, here V2-ds, is performed. However, the sequence is run differently because it is the second sequence illustrated in FIG. 3B which is followed, namely the sequence C, D, A, B.

A test 176 comparing the state vectors in sequence start records V2-ds and sequence end records V2-fs is also carried out, refreshing 178 the sequence start record in the situation where the test is negative.

When the test is positive output data S(P2) from processing by the second processor are extracted at stage 180.

Likewise processing 150 in third processor P3 is similar to the processing in first and second processors P1, P2, except for the order.

A stage 182 of initialising sequence start state register 112 is also performed. The sequence of automatic systems run is that of the third sequence illustrated in FIG. 3C, namely sequence D, C, B, A.

Likewise output data S(P3) from the automatic systems are provided to the sequence end state register in stage 184. A similar test 186 is carried out comparing state vectors V3-ds and V3-fs in sequence start state register 112 and sequence end state register 113. The sequence is run repeatedly until the test is positive.

If the test is negative, the sequence end state register refreshes, 188, sequence start register 112. If the test is positive the output data S(P3) from third processor P3 are extracted, 186, and delivered to command selection component 34. Each output from each processor S(P1), S(P2), S(P3) is sent to command selection component 34. In the command selection stage, 192, the output values from each of the processors are compared.

If the output values are all the same, output command C is equal to one of output values S(P1), S(P2), S(P3) validated and transmitted in stage 194 to receiving terminal 44 of the railway system control.

If one of these data are different, then in a stage 196 a signal gives warning of a fault in the control system rendered secure through diversification.

As a variant, a sequence formed from the set of automatic systems 198, 200, 202, 204, 206, 208, 210, 212, 214, 216 of a second embodiment of the program database is described in FIGS. 6A, 6B, 6C, 6D and 6E taken together.

In FIG. 6A these automatic systems are identified and referred to as P, Q, R, S, T, U, V, W, X, Y, Z.

The set of automatic systems 198, 200, 202, 204, 206, 208, 210, 212, 214, 216 is subdivided into three subgroups 218, 220, 222 or SG1, SG2, SG3, a first subgroup 218 or SG1 including automatic systems P, Q, R, a second subgroup 220 or SG2 including automatic systems S, T, V, W, and a third subgroup, 222 or SG3, including automatic systems X, Y, Z, respectively.

A sequence 224 of subgroups is described in FIG. 6B based on a cycle of subgroups 226 formed by the sequence SG1, SG2, SG3, a sequence start 228, here SG1, a path direction 230, here clockwise, and a sequence end 242 for subgroup 232, here SG3.

A sequence 240 of first subgroup SG1 is described in FIG. 6C. The sequence of first subgroup 240 is formed from a cycle 236, here P, Q, R, the sequence start 238 of which is here automatic system Q run in direction 240, here clockwise, with end of sequence 242 being automatic system P.

A sequence 244 of second subgroup SG2 is described in FIG. 6D based on a cycle 246, here S, T, V, W, the start of this sequence 248 being here automatic system S, cycle 250 being run in a clockwise direction, and end of sequence 252 being provided by automatic system W.

Finally the sequence of third subgroup SG3 is formed on the basis of cycle 256, here X, Y, Z, sequence start 258 including automatic system Z, and cycle 260 being run in a direction 260, here counter-clockwise, sequence end 262 being then determined by automatic system X. The sequence of automatic systems so obtained is formed by concatenating partial sequences 234, 244, 254 according to the sequence of subgroups SG1, SG2, SG3.

Thus the sequence of automatic systems described by the set of figures is Q, R, P, S, T, V, W, Z, Y, X.

Thus the different sets of instructions formed by different specific ordering of the modular application automatic systems may make it possible to use different circuit activation sequences in each of the processors having identical architecture, a sequence being defined in relation to the generic architecture of the processors.

Thus the different sets of instructions obtained may satisfy the diversification requirements placed on the control system by railway safety constraints.

Furthermore the process of processing these different sets of instructions may be simple to implement because only one software development platform can be used.

In fact development of the application modules using a single compiler may be reduced, as the application modules can be advantageously reused from one processing branch to another.

In an alternative embodiment, the control system described here above may operate without any substantial modification for aircraft or spacecraft on-board system or else for protection or emergency stopping system used in a nuclear installation.

Alternatively, the control system described hereabove may operate for all systems rendered secured by safety critical software design.

What is claimed is:

1. A control system for a railway system rendered secure through diversification comprising:
    at least two processors processing commands for the railway system, the processors arranged in parallel to receive identical input data on a corresponding input, each processor receiving a first and second set of instructions, each processor calculates and delivers identical output data at different outputs with respect to the identical input data, the first set of instructions being different than the second set of instructions,
    a command selection component including at least two inputs and a command output, each input connected to an output of a processor, the command output delivering a command signal selected from the processor output data, based on predetermined criterion,
    the first and second set of instructions corresponding to each processor running at least two modular application automatic systems, the modular application automatic systems being identical for the first and second sets of instructions,
    the first and second sets of instructions corresponding to each processor being specific to creating a subsequent activation sequencer for the modular application automatic systems in an associated sequence,
    each sequencer differing from other sequencers by the specific associated sequence.

2. The control system rendered secure through diversification as recited in claim 1 wherein each sequencer specifically activates and sequences the modular application automatic systems based on a different cyclical sequence of running the application automatic systems having the same cycle and a different cycle start or path direction.

3. The control system rendered secure through diversification as recited in claim 2 wherein each sequencer specifically activates and sequences the modular application automatic systems based on a different cyclical sequence of running the application automatic systems having the same cycle path in the same direction.

4. The control system rendered secure through diversification as recited in claim 1 wherein each sequencer specifically sequences the modular application automatic systems based on a different sequencer sequence formed from a succession of partial sequences of modular application automatic systems grouped into subgroups subdividing the set of modular application automatic systems in the control system.

5. The control system rendered secure through diversification as recited in claim 4 wherein the subgroups of automatic systems are the same for the at least two processors.

6. The control system rendered secure through diversification as recited in claim 1 wherein each modular application automatic system includes automatic system inputs and automatic system outputs,
    the automatic system input being external when receiving a variable item of input data from the control system,
    the automatic system output being external when delivering a variable item of output data from the control system,
    an input and an output for a same automatic system or two different automatic systems being internal when the input and output are being interconnected and exchanging a given variable internal item of data, the set of variable input items of data and output data of the automatic systems forming a state vector for the control system, for each processor the control system including a working memory, the working memory including a register for the start state when running the sequence of automatic systems containing the values for the set of state variables before the sequence of automatic systems is run, and a register for the end state when running the sequence of automatic systems containing the values of the set of state variables for the state vector obtained after running the sequence of automatic systems.

7. The control system rendered secure through diversification as recited in claim 6 wherein for each processor and while the sequence is being run, each processor only reads from the start state register and only writes to the end state register.

8. The control system rendered secure through diversification as recited in claim 7 wherein for each processor, the start state register for the sequence can only be written to and refreshed by the values for the state variables present in the sequence end register once the sequence has been run and each processor runs the sequence of automatic systems repeatedly until the values for the state variables of at least two associated state registers are the same.

9. The control system rendered secure through diversification as recited in claim 1 wherein each processor includes a program database including a set of processor instructions loaded into the processor and running the sequence of application automatic systems in the sequence ordered by the sequencer associated with the processor.

10. The control system rendered secure through diversification as recited in claim 9 wherein each program database includes a set of instructions obtained using the same compiler.

11. The control system rendered secure through diversification as recited in claim 1 wherein the command selection component is a component reaching a decision on the basis of a majority vote from the output data originating from all the processors, the component being able to compare the output data originating from the respective outputs of each processor and transmit common output data on a majority basis in relation to the set of processors on the basis of a predetermined majority criterion.

12. The control system rendered secure through diversification as recited in claim 11 wherein the command selection component is a component making decisions based on unanimity.

13. The control system rendered secure through diversification as recited in claim 1 that controls a rendered secure type railway system.

14. A secure control process for a system comprising stages comprising:
    loading at least two processors from program databases associated with different sets of instructions,
    providing identical input data to the processors arranged in parallel via respective inputs,
    running the different set of instructions associated with each processor, each processor computing and delivering identical output data at the respective outputs based on identical input data, the running of a set of instructions by a processor including the steps of:
        running at least two modular application automatic systems, the modular application automatic systems being identical for each set of instructions, in a specific sequence different from the sequences for the other sets of instructions,
        extracting the output data obtained after running the sequence, and
        delivering the output data to the command selection component,
    selecting a command signal selected from the output data originating from the processors, on the basis of a specific criterion.

15. The secure control process as recited in claim 14 further comprising the steps of:
    validating or correspondingly prohibiting transmission of the command issuing from the plurality of data outputs received, on the basis of the selection criterion; and
    signaling the existence of a fault in at least one processor in the event of prohibition.

* * * * *